United States Patent [19]

Meyer et al.

[11] 4,349,259
[45] Sep. 14, 1982

[54] EXPOSURE CONTROL MECHANISM FOR USE WITH CHEMICAL FLASH

[75] Inventors: James W. Meyer, Fairport; John E. Mooney, Rochester, both of N.Y.

[73] Assignee: Eastman Kodak Company, Rochester, N.Y.

[21] Appl. No.: 300,362

[22] Filed: Sep. 8, 1981

[51] Int. Cl.$^3$ .......................... G03B 15/03; G03B 9/26
[52] U.S. Cl. .................................... 354/135; 354/147; 354/253
[58] Field of Search ............... 354/129, 135, 139, 147, 354/149, 250–253

[56] References Cited

U.S. PATENT DOCUMENTS

| | | | |
|---|---|---|---|
| 598,804 | 2/1898 | Mosher | 354/184 |
| 709,837 | 9/1902 | Wheeler | 354/258 |
| 1,986,513 | 1/1935 | Mendelsohn | 354/133 |
| 1,989,109 | 1/1935 | Munder | 354/133 |
| 2,384,639 | 9/1945 | Riddell | 354/253 |
| 2,940,374 | 6/1960 | Fuerst | 354/253 |
| 3,479,946 | 11/1969 | Bohm | 354/231 |
| 3,587,434 | 6/1971 | Ort | 354/260 |
| 3,967,142 | 6/1976 | Beach | 310/83 |

FOREIGN PATENT DOCUMENTS 717295  9/1965 Canada .............................. 354/147
2022475 11/1971 Fed. Rep. of Germany ...... 354/135

*Primary Examiner*—Donald A. Griffin
*Attorney, Agent, or Firm*—Thomas H. Close

[57] ABSTRACT

An exposure control mechanism for use with chemical flash illumination includes a shutter having a primary shutter blade mounted for pivotal movement between a rest position wherein the shutter blade covers an exposure aperture, through an intermediate position wherein the shutter blade uncovers the exposure aperture, and a rebound position. A spring urges the shutter blade toward the rest position. A shutter driver drives the primary shutter blade from the rest position to the rebound position, and a flash firing mechanism synchronized with the shutter driver ignites a chemical flashlamp substantially simultaneously with the start of movement of the primary shutter blade. An auxiliary shutter blade operatively coupled to the primary shutter blade, covers the exposure aperture during movement of the primary shutter blade through its intermediate position on its way from its rest position to its rebound position, and uncovers the exposure aperture during movement of the primary shutter blade through its intermediate position on its way from its rebound position to its rest position, thereby effecting an exposure after an initial delay.

4 Claims, 8 Drawing Figures

EXPOSURE CONTROL MECHANISM FOR USE WITH CHEMICAL FLASH

BACKGROUND OF THE INVENTION

1. Field of the Invention

The present invention relates to exposure control mechanisms in photographic cameras, and more particularly to a shutter mechanism including means for synchronizing shutter operation with the output of a chemical flash device.

2. Discussion Related to the Problem

Relatively fast shutter speeds may be used to expose modern, high-speed amateur color film (e.g. ASA 400), thereby reducing the effects of relative camera-subject motion and resulting in sharper pictures. Some popularly priced amateur cameras take advantage of the extra sharpness that can be achieved by having relatively fast (e.g. 1/200 to 1/500 second) shutter speeds for daylight operation. Unfortunately, the performance of low priced amateur cameras employing chemical flash illumination for indoor operation have not similarly benefited from the advent of fast films. One popular format for chemical flash employs a flash firing mechanism comprising a piezoelectric crystal that is struck to generate a pulse of electricity to ignite the contents of the chemical flashlamp. Generally, the piezoelectric crystal is struck at the same time that the shutter is opened, or shortly before (see for example U.S. Pat. No. 3,967,142). FIG. 1 shows a plot of the light intensity produced by such a piezoelectrically ignited flashlamp versus time. At time 0, the crystal is struck. As can be seen from the Figure, it takes approximately 15 milliseconds from the time that the piezoelectric crystal is struck to the point where the output of the flashlamp reaches its peak intensity. If a fast shutter speed is employed (e.g. 2 to 5 milliseconds; 1/500 to 1/200 second) and the shutter is opened immediately upon striking the piezoelectric crystal, the flash intensity will not have approached its peak before the shutter is closed. Most of the flashlight will be wasted. To overcome this problem, most inexpensive prior art cameras are designed to employ a relatively slow shutter speed (e.g. 30 milliseconds) in the flash mode. By using such a slow shutter speed, the shutter is sure to be open when the flashlamp reaches its peak intensity. Although this technique makes full use of the flash illumination available, it sacrifices the sharpness available in the high speed film. An improvement on this approach to flash synchronization is to delay the opening of the shutter until the flash intensity has approached its peak, then to open the shutter for a relatively short exposure time. The problem faced by the inventors was to provide a simple mechanical shutter mechanism that could be actuated in synchronism with the ignition of a flash device, and after a predetermined delay, would produce a relatively short exposure.

SOLUTION TO THE PROBLEM—SUMMARY OF THE INVENTION

The above-noted problem was solved according to the present invention by providing an exposure control mechanism with a shutter having a primary shutter blade mounted for pivotal movement between a rest position (wherein the primary shutter blade covers the exposure aperture), through an intermediate position (wherein the primary shutter blade uncovers the exposure aperture), and a rebound position. A spring urges the shutter blade toward its rest position. A shutter driver drives the primary shutter blade from its rest position to its rebound position, and a flash firing mechanism synchronized with the shutter driver ignites a chemical flashlamp substantially simultaneously with the start of movement of the primary shutter blade. An auxiliary shutter blade operatively coupled to the primary shutter blade covers the exposure aperture during movement of the primary shutter blade through its intermediate position on its way from its rest position to its rebound position, and uncovers the exposure aperture during movement of the primary shutter blade through its intermediate position on its way from its rebound position to its rest position, thereby effecting an exposure after an initial delay.

In a preferred embodiment of the invention, the mass of the primary shutter blade, the tension of the spring urging the primary shutter blade toward its rest position, the location of the rebound position, and the force of the shutter driver are selected to cause the primary shutter blade to travel from its rest position through its intermediate position to its rebound position and back to its intermediate position in approximately 15 milliseconds. The auxiliary shutter blade comprises a flap, hinged to the primary shutter blade. The flap is adapted to swing to cover the aperture when the primary shutter blade moves toward its rebound position, and to uncover the aperture when the primary shutter blade moves toward its rest position from its rebound position.

BRIEF DESCRIPTION OF THE DRAWINGS

The invention will be described with respect to the drawings, wherein.

DESCRIPTION OF THE PREFERRED EMBODIMENTS

Since photographic cameras are well known in the art, the present description will be limited to those elements forming part of or cooperating directly with the invention. The elements of a camera that are not shown or described herein are understood to be selected from those known in the art.

Figure 1:
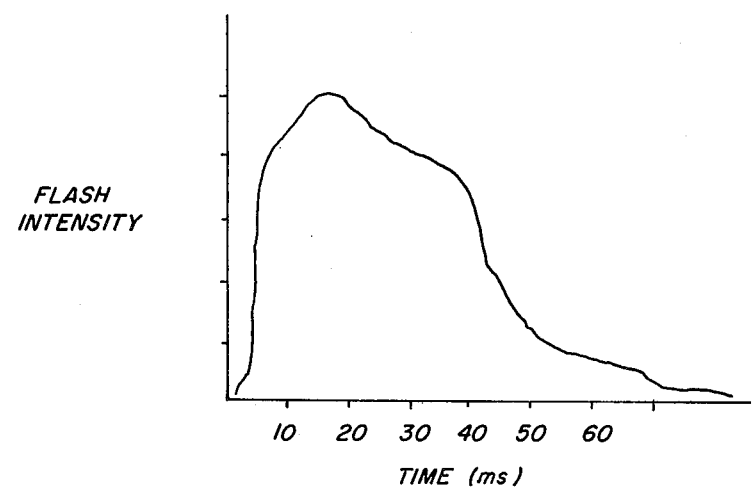
FIG. 1 is a graph showing the light intensity from a piezoelectrically ignited flash lamp versus time.
Figure 2:
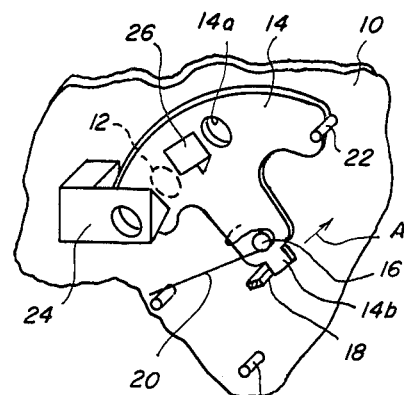
FIGS. 2–7 are a series of perspective views illustrating the operation of the primary and auxiliary shutter blades in the exposure control apparatus according to the present invention.

Referring now to FIG. 2, the exposure control mechanism is mounted on a camera mechanism plate 10 (partially shown) that defines an exposure aperture 12. A primary shutter blade 14 is pivotally mounted on the mechanism plate at a pivot axis 16. Primary shutter blade 14 defines an aperture 14a and has an extension 14b that extends into the path of a shutter striker 18. Striker 18 (partially shown) is operated by spring force upon release of a shutter actuating button (not shown). In a presently preferred embodiment, the primary shutter blade was formed from a sheet of beryllium copper approximately 10 mil. thick to give it a relatively high inertial mass. In its rest position, as shown in FIG. 2, the primary shutter blade 14 is urged by a spring 20 into a stop 22 and covers the exposure aperture 12. A lens block 24 for holding a photographic objective lens (not shown), is arranged adjacent the mechanism plate 10 and forms a gap therewith in which a portion of the primary shutter blade resides. Secured to the primary shutter blade 14 is an auxiliary shutter blade 26. Auxiliary shutter blade 26 is hinged to primary shutter blade 14 in such a manner that it can swing in one direction to cover aperture 14a in primary shutter blade 14, or it can swing in the opposite direction to uncover the aperture 14a. In a preferred embodiment, auxiliary shutter blade 26 was formed from a piece of opaque 3 mil Mylar Plastic film, that was folded along a line to form the hinge, and cemented to the primary shutter blade with epoxy. The Mylar was folded to form a "living hinge" such that in the absence of other forces, the auxiliary shutter blade normally extended at about a ninety degree angle from the primary shutter blade, as shown in FIG. 2.

Figure 3:
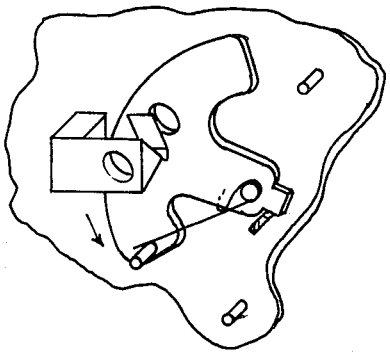
Figure 4:
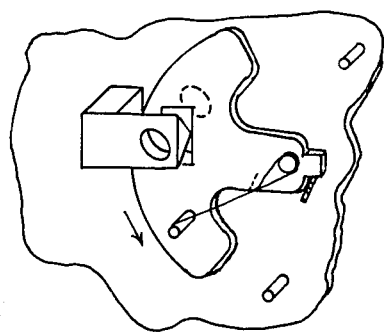
Figure 5:
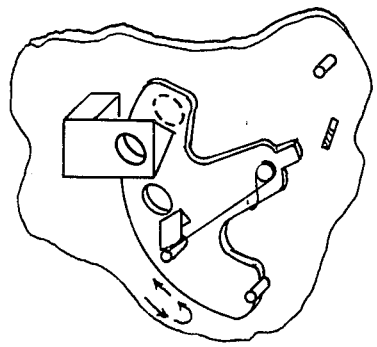
Figure 6:
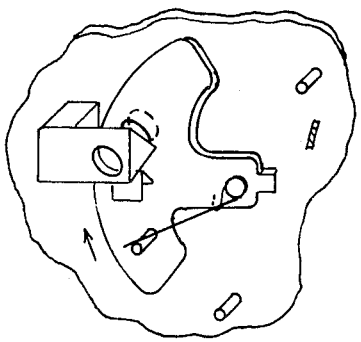
Figure 7:
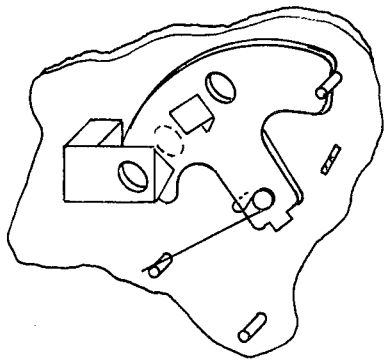

When the shutter is actuated, striker 18 moves along the path indicated by the arrow A shown in FIG. 2, first striking extension 14b of primary shutter blade 14. The impact causes primary shutter blade 14 to rotate in a counterclockwise direction against the force of spring 20 as seen in FIG. 3. As auxiliary shutter blade 26 encounters the lens block 24, it is forced to fold down, covering the aperture 14a in the primary shutter blade 14 so that no exposure takes place (see FIG. 4). As the primary blade continues to rotate in a counterclockwise direction, the striker 18 leaves contact with extension 14b and the auxiliary shutter blade 26 emerges from behind lens block 24. Auxiliary shutter blade 26 springs up to uncover aperture 14a after aperture 14a has passed by aperture 12, and primary shutter blade 14 is covering aperture 12. The primary shutter blade continues in its counterclockwise direction until it encounters a rebound stop 28 (see FIG. 5). The primary shutter blade 14 bounces off the rebound stop 28 and returns in a clockwise direction with the aid of spring 20 toward its rest position. As auxiliary shutter blade 26 encounters lens block 24 for the second time, it is folded back away from aperture 14a, thereby effecting an exposure as aperture 14a coincides with aperture 12, as shown in FIG. 6. The primary shutter blade continues to its rest position thereby terminating the exposure as shown in FIG. 7. Thus, as can be seen from the above explanation, an exposure is effected after a predetermined time delay. In the preferred embodiment of the invention, the mass of the primary shutter blade, the force of spring 20, the force of the striker, and the position of rebound stop 28 were chosen to provide an exposure of about 4 milliseconds after an initial delay of about 12 milliseconds. With an F-11 lens, a General Electric "Flip Flash" brand piezoelectrically actuated flashlamp, and ASA 400 speed color film, this combination gave normal exposure at approximately 9 feet with noticably improved sharpness over the exposures of prior art cameras employing longer shutter times in the flash mode.

Figure 8:
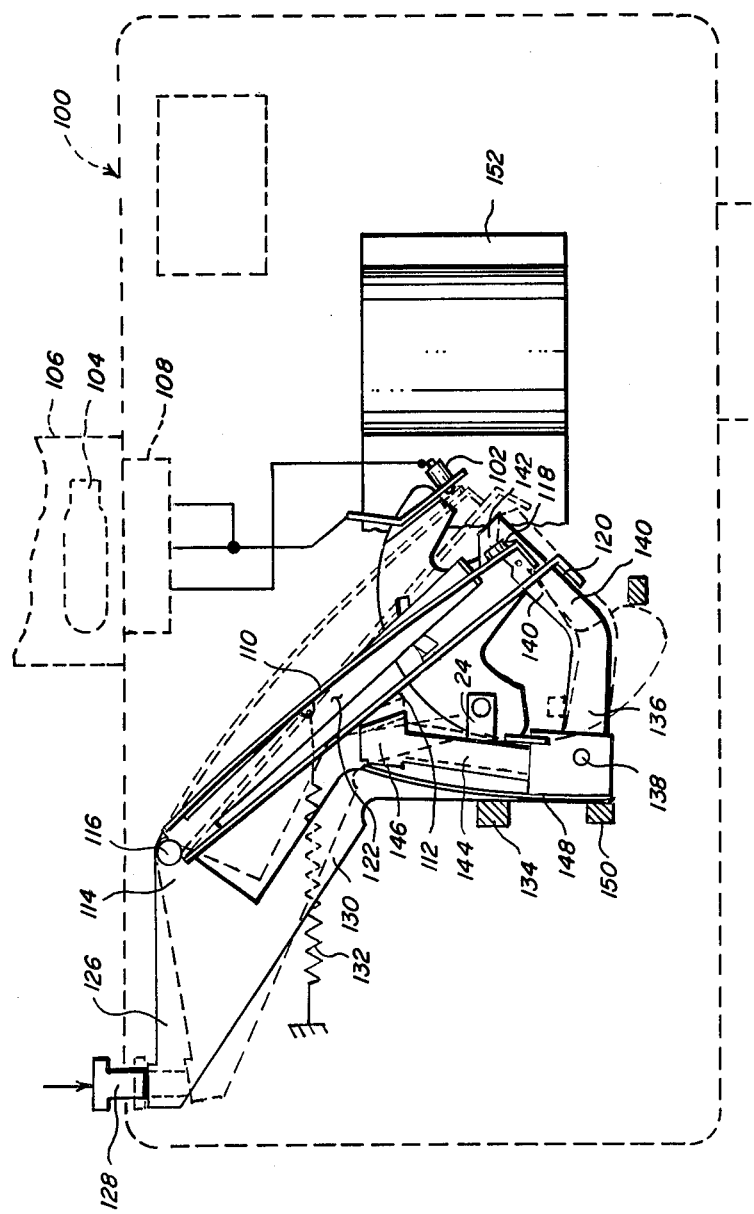
FIG. 8 is a perspective schematic view of an exposure control apparatus according to the present invention.

Referring now to FIG. 8, one mechanism that may be employed to synchronize the firing of the flash and release of the shutter striker will be described. The mechanism is mounted in a camera body 100, shown in phantom, which contains a piezoelectric generator 102 adapted upon being struck to ignite a flash lamp 104 contained in a multiple flash unit 106 (partially shown). The multiple flash unit is received in a flash socket 108 in the body of the camera. The flash firing and shutter actuating mechanism comprises a flash firing spring 110 and a shutter actuating spring 112 integrally formed on an actuating member 114 that is pivotally mounted at a pivot axis 116 within on the camera body. A hammer 118 is attached to the distal end of flash firing spring 110 and a striker 18 is formed on the end of shutter actuating spring 112. A retaining bar 122 is also integrally formed from actuating member 114, and includes a finger portion 124 adapted to engage flash firing spring 110 when in the rest position. Flash firing spring 110 in turn engages shutter actuating spring 112 when in the rest position.

Actuating member 114 includes an extension 126 disposed in the path of a shutter release button 128. The shutter release button is adapted to be pressed by the camera operator to effect an exposure. The extension 126 includes a generally downwardly projecting leg 130. A spring 132 connected between leg 130 and the camera body urges the actuating member 114 in a clockwise direction as seen in FIG. 8 about pivot axis 116 into a stop 134 formed as a part of the camera body.

A latch member 136 is pivotally mounted to the camera body at a pivot axis 138. The latch member 136 includes a first leg 140 having a latch end 142, which is adapted to engage a portion of flash firing spring 110. The latch member 136 includes a second leg 144 having a tab 146 disposed in the path of downwardly projecting leg 130 of actuating member 114. An integrally formed leaf spring 148 on latch member 136 pushes against a stop 150 formed from a part of the camera body to urge latch member 136 in a counterclockwise direction as seen in FIG. 8 toward latching engagement with flash firing spring 110.

In operation, when the shutter release button 128 is depressed, it encounters extension 126 of the actuating member 114, causing actuating member 114 to pivot around pivot axis 116 in a counterclockwise direction as seen in FIG. 8, against the force of spring 132. As actuating member 114 pivots, latch member 136 holds the distal ends of the flash firing spring 110 and the shutter actuating spring 112 in their respective rest positions; retaining bar 122 moves away from firing spring 110; and springs 110 and 112 are bowed, thereby accumulating potential energy in the springs. After downwardly projecting leg 130 on actuating member 114 encounters tab 146 of latch member 136, further movement of actuating member 114 causes latching member 136 to pivot clockwise about pivot axis 138 and to thereby release firing spring 110 and actuating spring 112. Upon release, the flash firing spring propels hammer 118 into contact with piezoelectric generator 102 (illustrated by dotted lines in FIG. 8) to ignite the flashlamp. The shutter actuating spring follows the flash firing spring, and the striker 18 strikes extension 14b on shutter blade 14 (the numbering of the parts of the shutter mechanism is the same in FIG. 8 as in FIGS. 2–7 above). After an initial delay to allow the flash output to reach its peak, the shutter uncovers exposure aperture 12 as described above to expose a photographic film (not shown) contained in cartridge 152 (partially shown).

A further advantage of an exposure control mechanism according to the present invention is that it can be used for both daylight and flash exposures without the need for changing the shutter speed.

Means may also be provided in the camera (not shown) for inhibiting operation of the actuating mechanism after each exposure until the film has been advanced to prevent double exposures.

The invention has been described in detail with particular reference to a preferred embodiment thereof, but it will be understood that variations and modifications can be effected within the spirit and scope of the invention.

For example, although the invention has been described with reference to piezoelectrically ignited chemical flash lamps, it can be used equally well with chemical flash lamps that are fired by striking a primer cap, or by closing a switch connecting a battery to the lamp.

We claim:

1. In a photographic camera of the type adapted to receive chemical flashlamps, an exposure control mechanism for effecting an exposure in synchronism with the peak output of a flashlamp, comprising:

shutter release means adapted to be actuated by a camera operator for effecting an exposure;

flash firing means coupled to said shutter release means for igniting a chemical flashlamp in response to actuation of said shutter release means; and shutter means for effecting an exposure in synchronism with the peak output of said flashlamp, said shutter means including delay means for delaying said exposure until the intensity of the flashlamp has substantially reached a maximum, said shutter means comprising a primary shutter blade, mounted for pivotal movement between a rest position wherein said primary shutter blade covers an exposure aperture, and a rebound position, through an intermediate position, wherein said primary shutter blade uncovers the exposure aperture;

spring means for urging said primary shutter blade toward said rest position;

drive means, coupled to said shutter release means, for moving said primary shutter blade from said rest position to said rebound position; and auxiliary shutter blade means for covering the exposure aperture during movement of said primary shutter blade from said rest position to said rebound position, and for uncovering the exposure aperture during movement of said primary shutter blade through said intermediate position from said rebound position to said rest position.

2. In a photographic camera of the type using chemical flashlamps, an exposure control mechanism for covering and uncovering an exposure aperture in synchronism with the peak output of a flashlamp, comprising:

a primary shutter blade mounted for pivotal movement back and forth from a rest position wherein said primary shutter blade covers the exposure aperture, through an intermediate position, wherein said primary shutter blade uncovers the exposure aperture, to a rebound position;

spring means for urging said primary shutter blade toward said rest position;

drive means for causing said primary shutter blade to move from said rest position to said rebound position;

flash firing means for igniting a chemical flashlamp substantially simultaneously with the start of movement of said primary shutter blade; and auxiliary shutter blade means for covering the exposure aperture during movement of said primary shutter blade through said intermediate position from said rest position to said rebound position, and for uncovering said exposure aperture during movement of said primary shutter blade through said intermediate position from said rebound position to said rest position.

3. The invention claimed in claim 2 wherein said auxiliary shutter blade means comprises a flap hinged to said primary shutter blade in such a way that said flap: (1) covers the exposure aperture during movement of said primary shutter blade from said rest position, to said rebound position; and (2) uncovers the exposure aperture during movement of said primary shutter blade from said rebound position to said rest position.

4. The invention claimed in claim 3, wherein said flap is formed from a film of opaque plastic, attached by a living hinge to said primary shutter blade, and further comprising abutment means adapted to encounter said flap during movement of said primary shutter blade from said rest position to said rebound position to cause said flap to cover the exposure aperture; and to encounter said flap during movement of said primary shutter blade back from said rebound position toward said rest position to cause said flap to uncover said exposure aperture.

* * * * *